United States Patent

Pasko

[15] 3,639,985
[45] Feb. 8, 1972

[54] DENTAL INSTRUMENT

[72] Inventor: Victor Pasko, 1053 North Winchester Ave, Chicago, Ill. 60622

[22] Filed: Apr. 14, 1970

[21] Appl. No.: 3,835

[52] U.S. Cl..................................................................32/11
[51] Int. Cl........................................................A61c 13/00
[58] Field of Search..............................32/17, 40, 11; 18/5.7

[56] References Cited

UNITED STATES PATENTS

| | | | |
|---|---|---|---|
| 2,836,849 | 6/1958 | Humphrey | 32/40 |
| 3,277,576 | 10/1966 | Kraft | 32/11 |
| 3,469,316 | 9/1969 | Stern et al. | 32/17 |
| 3,552,018 | 1/1971 | Zahn | 32/11 |

Primary Examiner—Robert Peshock
Attorney—Stone, Zummer & Aubel

[57] ABSTRACT

A dental instrument for use in a dental laboratory, particularly useful in making dental appliances. The dental instrument includes an elongated deformable rod which is manually deformed with facility. The elongated rod has a knurled flat mounting section on one end, particularly adapted for attachment to a mold tray, and a knurled flat holding portion on the other end. A coil spring is secured to the other end for holding releasably a dowel pin against the flat holding portion. The rod is manipulated to position the dowel pin in an appropriate location of a dental mold for making a dental appliance such as a wax model for a crown.

2 Claims, 6 Drawing Figures

PATENTED FEB 8 1972          3,639,985
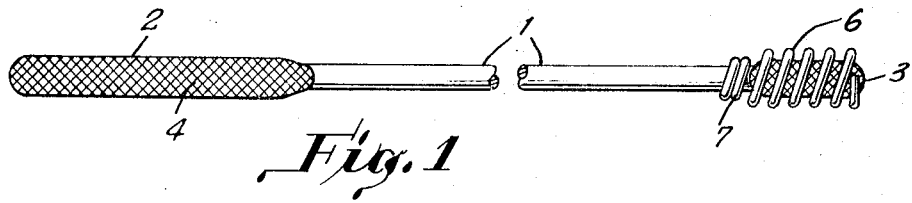
Fig. 1
Fig. 2
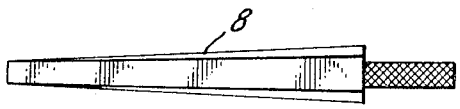        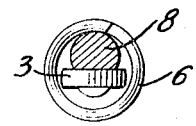
Fig. 3      Fig. 4      Fig. 5
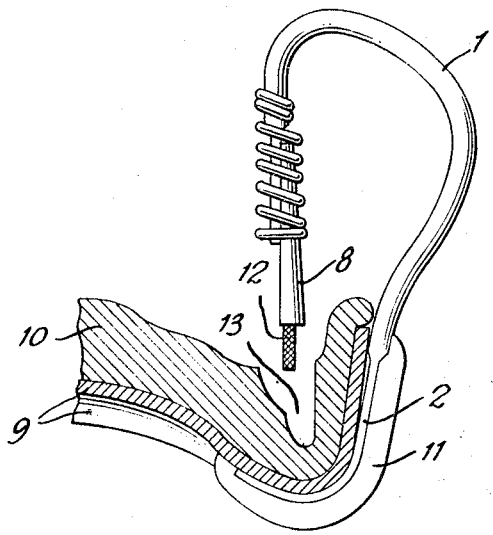
Fig. 6
INVENTOR.
Victor Pasko

DENTAL INSTRUMENT

BACKGROUND OF THE INVENTION

In the manufacture of certain dental appliances in a dental laboratory, and in particular in the manufacture of gold crowns, it is necessary to make the gold crown in such a manner that the crown will fit into a given space in a patient's mouth and the crown will abut adjacent teeth and mesh with opposed teeth. In the common method, the dentist removes a portion of the tooth to form the tooth to an appropriate configuration for receiving a crown. After the tooth is appropriately formed, an impression is taken of the teeth, and a model is made up from the impression. A wax model is made of the crown. In order to form and to position the wax model accurately, a dowel pin is provided, which dowel pin fits into the model in a well-known fashion. A die is mounted on the head of the dowel pin, which die is in a configuration which is a portion of the tooth. In making the model, it is necessary to position accurately the die relative to the mold, and thereby support the die and the dowel pin in a given location. Heretofore, in the common method, the dowel pin has been held in position by placing the dowel pin in a piece of wax and resting the wax over the mold. The slightest jarring or vibration moves the wax and thus the dowel pin and die so that the dowel pin, with the die, is not located properly. Furthermore, in many instances, it is difficult for a dental technician to inspect the exact position of the dowel pin and the die relative to the mold with a piece of wax encumbering the technician's view.

SUMMARY OF THE INVENTION

The present invention relates to an improved dental instrument, which is an improved dental dowel pin holder. The instant instrument is readily attached to a mold tray in a location which is generally appropriate for the position of the dental dowel pin and the associated die. The dowel pin then may be manipulated to a selected position which is the perfect location for the die relative to the particular mold. The dowel pin is securely held in position by a readily deformable rod with a gripper on one end thereof. The gripper holds the dowel pin securely, and the rod which may be easily deformed by the application of manual force stays in a selected position. The dowel pin is not readily displaced by a vibration in view of the fact that the dowel pin is, in effect, fixed to the tray and thus the mold.

It is a principal object of this invention to provide a dental instrument for positioning precisely a dental dowel pin and associated die relative to a dental impression.

It is another object of this invention to provide a dental instrument in which a dental dowel pin may be readily and conveniently positioned by a dental technician.

It is a further object of this invention to provide a simple, inexpensive dental dowel pin position-holding device which has a high degree of reliability.

Other objects and uses of the present invention will become readily apparent to those skilled in the art upon a perusal of the following specification in light of the accompanying drawing.

BRIEF DESCRIPTION OF THE DRAWING

FIG. 1 is a plan view of a dental dowel pin position holder embodying the instant invention, with the center portion of a rod broken away;

FIG. 2 is a side elevational view of the dental dowel pin position holder shown in FIG. 1, but with a dental dowel pin shown mounted on one end;

FIG. 3 is an enlarged plan view of the dental dowel pin shown in FIG. 2;

FIG. 4 is an end view of the dental dowel pin shown in FIG. 3;

FIG. 5 is an enlarged cross-sectional view taken on line 5—5 of FIG. 2, showing the dental dowel pin held in engagement with a portion of a readily deformable rod by a coil spring; and FIG. 6 is a cross-sectional view taken through a mold and tray, showing the dental dowel pin, deformable rod and pin gripper mounted in an attitude for use.

DESCRIPTION OF THE PREFERRED EMBODIMENT

Referring now to the drawing, a specific embodiment of the instant dental instrument is shown therein. The dental instrument includes an elongated support rod 1 which is this instant is made of a soft, readily deformable aluminum. The rod 1 has an elongated flat mounting section 2 formed integral with one end. The other end of the rod 1 includes an integrally formed knurled flat holding portion 3. The flat mounting section 2 contains knurling 4 on both sides thereof to provide a friction surface for holding the support rod in position.

A dental dowel pin gripper 6 is mounted on the support rod 1 adjacent to the flat holding portion 3. The dowel pin gripper is a coil spring having a pair of locking coils 7. The locking coils 7 are wound to a smaller diameter than the remainder of the coils so that the locking coils resiliently engage the rod and hold the gripper in position adjacent to the flat holding portion.

A dental dowel pin 5 is shown attached to the rod 1 in FIGS. 2, 5 and 6. The dental dowel pin 5 is in this instance a brass dowel pin, although any other suitable material may be used. The dowel pin includes a generally conically tapered body 8 which has a flat side, as may be seen in FIGS. 3, 4 and 5. A knurled stud 12 is formed integral with the body 8 to provide a convenient means for attaching a die to the dowel pin, which die is not shown herein since it is well known in the art.

A dental impression or mold 10 is made in a conventional manner, and is in this instance a hard cement, such as, gypsum, though any suitable material may be used. The dental impression 10 is securely mounted in a metal tray 9, as is conventional in the art.

The instant dental instrument is used in the following manner. The dowel pin 5 is inserted between the interior of the coils of the gripper 6 and the flat holding portion 3. Ordinarily, a die is secured to stud 12, but the die is not shown in this instance since the construction and mounting of the die is well known in the art. Inasmuch as the body 8 is tapered, the coil spring resiliently but securely holds the dowel pin in tight engagement with the knurled surface of the flat holding portion 3. The knurling holds the dowel pin since the taper of the dowel pin coacting with the spring has a tendency to force the dowel pin out of the spring.

The support rod 1 is secured to the tray 9 at an appropriate position relative to the mold. The flat mounting portion 2 is first bent to conform to the shape of the tray at the position where the instant dental instrument is to be installed. The dental instrument is generally located so that the dowel pin with the die is in its approximate position for use. A sticky wax 11, which provides a means for releasably holding the mounting section, is then applied to the mounting section 2 and to the tray to secure releasably the rod to the tray. It may be appreciated that the knurling 4 of the flat mounting section becomes imbedded in the sticky wax, and the wax is also secured to the tray so that the rod is firmly secured to tray 9, which tray has the mold 10 securely mounted therein.

Once the rod is secured to the tray, a technician then readily and conveniently positions the dowel pin relative to the mold by simply bending the support rod with his fingers or with simple tools, as may be required. The dowel pin is secured to the rod by the gripper so that the dowel pin is fixed to the tray through the rod 1. Thus, should there be any movement of the tray, either by vibration or by handling, the position of the dowel pin relative to the mold remains constant. It is important to note that the dowel pin and the mold are all part of an effectively integral unit which remains integral under normal careful handing. Thus, a technician may lift the entire assembly and inspect the assembly from various angles in order to determine the accuracy of the positioning of the dowel pin. Once the dowel pin has been appropriately positioned, the further well-known steps in the utilization of the dowel pin are then taken, after which steps the dowel pin is readily released from the gripper by simply pulling the body out of the spring to disengage the pin from the flat holding portion. It may be appreciated that the rod and gripper may be reused with the same or other dental dowel pins for a large number of times.

Although a specific embodiment of the herein-disclosed invention has been shown and described in detail, it is readily apparent that those skilled in the art may make various modifications and changes in the materials and structures of the various parts without departing from the spirit and scope of the present invention. It is to be expressly understood that the instant invention is limited only by the appended claims.

What is claimed is:

1. A reusable dowel holder for holding an elongated tapered dowel when making a positive replica of a tooth from a negative impression of a tooth comprising, an elongated readily permanently deformable aluminum wire rod having an elongated flat knurled mounting section on one end for secure connection to a dental impression, a knurled flat holding portion on the other end, and a dental dowel pin gripper connected to the other end of the rod whenever the dental dowel pin gripper is a coil spring having at one end a coil reduced in size engaging the rod to secure the coil spring adjacent the other end of the rod.

2. A reusable dowel holder for holding an elongated tapered dowel when making a positive replica of a tooth from a negative impression a tooth comprising, an elongated readily permanently deformable aluminum wire rod having an elongated flat knurled mounting section on one end for secure connection to a dental impression and a knurled flat holding portion on the other end, a coil spring having at one end a coil reduced in size engaging the rod adjacent to the holding portion to secure the coil adjacent to said holding portion, and a dental dowel pin releasably held by the coil spring to secure releasably the dental dowel pin to the rod, said dowel pin having a flat side for engagement with the knurled flat holding portion.

* * * * *